United States Patent [19]

Januschkowetz

[11] Patent Number: 4,713,944
[45] Date of Patent: Dec. 22, 1987

[54] INTERMITTENTLY OPERATING SORPTION APPARATUS WITH SOLID SORBENT FOR HEAT AND COLD STORAGE

[75] Inventor: Gerhard Januschkowetz, Munich, Fed. Rep. of Germany

[73] Assignee: Schiedel GmbH & Co., Munich, Fed. Rep. of Germany

[21] Appl. No.: 904,649

[22] Filed: Sep. 8, 1986

[30] Foreign Application Priority Data

Sep. 9, 1985 [DE] Fed. Rep. of Germany ....... 3532093

[51] Int. Cl.$^4$ ............................................. F25B 17/08
[52] U.S. Cl. ......................................... 62/480; 62/239
[58] Field of Search ...................... 62/106, 119, 235.1, 62/480, 239

[56] References Cited

U.S. PATENT DOCUMENTS

| | | | |
|---|---|---|---|
| 4,199,952 | 4/1980 | Berg | 62/480 X |
| 4,205,531 | 6/1980 | Brunberg et al. | 62/480 X |
| 4,250,720 | 2/1981 | Siegel | 62/480 |
| 4,581,049 | 4/1986 | Januschkowetz | 62/119 X |
| 4,610,148 | 9/1986 | Shelton | 62/106 X |
| 4,637,218 | 1/1987 | Tchernen | 62/106 |

Primary Examiner—Lloyd L. King
Attorney, Agent, or Firm—Spencer & Frank

[57] ABSTRACT

Intermittently operating sorption head and cold storage apparatus having a storage vessel forming a first structural unit. The storage vessel comprises a gas-tight housing and a solid sorption agent which can be heated by a heating medium and is thermally conductively in communication with a heat-eliminating heat-exchange fluid by a first heat-exchanger. The apparatus also has a second heat-exchanger defining at least one of an evaporator and a condenser forming a second structural unit and having a pressure-resistant housing. This unit is thermally conductively in communication by a second heat-exchange device with a heat-exchange fluid capable of eliminating heat in the condensation phase or suppling heat in the evaporation phase. The apparatus also has a pressure-resistant external flow connection for a working medium carried in a closed system between the two structural units. The first structural unit is thermally insulated and the first heat-exchange means has a pressure-resistant conduit embedded in the solid. The second structural unit is thermally insulated and the second heat-exchanger has a pressure-resistant conduit surrounded by the thermal insulator. The flow connection between the storage vessel and the second heat-exchanger is of a low heat conductivity material. Valves for controlling the heat-exchange fluids are also provided.

32 Claims, 7 Drawing Figures

INTERMITTENTLY OPERATING SORPTION APPARATUS WITH SOLID SORBENT FOR HEAT AND COLD STORAGE

BACKGROUND OF THE INVENTION

1. Field of the Invention

The invention relates to a intermittently operating sorption apparatus with a solid-matter absorbent for heat and cold storage. The basic components of such an apparatus are a storage vessel having a solid absorbent, an evaporator and/or a condenser for a working medium. The working medium is circulated through the above components within a pressure-resistant conduit system.

2. Description of the Background

In recent times, valve and/or pump devices have typically been added to pressure-resistant conduit systems to control the intermittent operation of a working medium. Regardless of whether this conduit system is operated at negative pressure or high pressure relative to the atmosphere valve and/or pump devices are expensive and often subject to malfunctioning and they are a possible leakage source. An example of this type of technology is given in German patent disclosure document DE-OS No. 3,207,656 (see reference numerals 13, 18, 19, 42 in FIG. 2 of the reference) or European patent document No. A 2-0,026,257 (see 382a, 390a, 388, 341, 386a in FIG. 3 of the reference). A fundamental survey of quite recent date on this technology is provided by the article entitled, "Zeolith-Wasser: Neues Stoff-paar für Wärmepumpen und Wärmespeicher" (Zeolite/Water: A New Substance Pair for Heat Pumps and Heat Storage Means), in the journal CCI 2/1984. A basic functional description in thermodynamic terms is also provided by the article entitled, "Thermochemical Heat Storage and Heat Transformation with Zeolites as Absorbents", in Proc. IEA Conf. on New Energy Conservation Technologies and Their Commercialization, Berlin, Apr, 6–10, 1981, J. P. Millhone and E. H. Willis, eds., Springer Verlag, Berlin—Heidelberg—New York, publishers (1981), Vol. 1, page 796.

In this type of known apparatus, the evaporator and the condenser have also been combined into an evaporator/condenser structural unit (U.S. Pat. No. 4,250,720, see reference numeral 14). However, a corresponding valve device (reference numerals 18, 19 of the patent) continued to be used at the hydraulic connection with the storage vessel (reference numeral 16 of the latter patent). In this prior art apparatus, the control of the operating phases can be performed by the valve device actuating or shutting off a heat source provided on an absorber/desorber. The result, however, is a compulsory return flow of the working medium vapor unless the valve device in the primary system is previously closed. Exact control of the operating phase is therefore possible only by means of this valve device located in the primary loop.

There is a considerable history of the construction of sorption storage apparatuses. Taking the basic thermodynamic function of the above components as a point of departure, continuous flow connections have already been provided between the storage vessel and an evaporator/condenser. By means of example, the following references can be cited in chronological order, U.S. Pat. No. Re. 5,287 (1873), U.S. Pat. No. 992,560 (1911) and German Pat. No. 738,333 (1943), which utilize water as the liquid sorption agent and ammonia as the working medium in the latter patent and a solid matter sorption agent in the two earlier patents.

Technological development of sorption apparatus having solid absorbents practically ceased in the 1940s and early 1950s (German Pat. Nos. 522,887 (1931), 722,164 (1942) and 814,157 (1951) and French Pat. No. 1,018,022 (1952)). All of these earlier known apparatuses also have an evaporator/condenser. These prior art apparatuses have the basic disadvantage that the sorption agent is immediately recharged with a working medium as soon as the supply of heat is interrupted in the desorption phase. As a consequence, neither the cold nor the heat generated, which heat in these previously known apparatuses is solely used as waste heat, can be stored for any significant length of time.

Moreover, evaporator/condensers are disadvantageous in principle. In the evaporation phase, the specific heat of the evaporator/condenser, along with the working medium it contains, must be brought from the condensation temperature to the cooling temperature in the first step. As a result, refrigerating capacity is lost to the cold consumer or absorber.

Similarly, in the desorption phase, the evaporator/condenser along with the remaining working medium contained in it must be heated to the condensation temperature. Thus, this thermal capacity is lost to any heat consumer or absorber present in the system. This latter aspect is admittedly secondary in apparatuses of this generic type because any heat that is produced is merely destroyed as waste heat. Nevertheless, the efficiency of combination evaporator/condensers is lower in principle than that of separate than that of the aggregate of evaporators and condensers.

The above-described old technology wherein a storage vessel, a condenser and an evaporator are in flow communication came to a dead end for the stated reasons. Interest shifted then to a valve control system as described supra. In such system, the evaporation of the working medium in the condenser during the absorption phase and the condensation of the working medium in the evaporator during the desorption phase, can be prevented.

The point of departure for the invention is a known, intermittently operating sorption storage apparatus with a solid absorbent according to German patent disclosure document DE-OS No. 3,212,608 which is structurally similar to the apparatus of this invention. In this known apparatus, however, the operating phases are also controlled by control devices, e.g., control valves and pumps in the primary system of the working medium. Thus, all the problems fundamentally associated with such features in the previously described technology remain.

Accordingly, there is still a need for a sorption storage apparatus which avoids the problems associated with the prior art valve devices in the primary system while at the same time storing heat or cold, or both, for relatively long periods of time and precisely controlling the operating phases.

SUMMARY OF THE INVENTION

This invention relates to an intermittently operating sorption apparatus for heat and cold storage comprising a thermally insulated storage vessel comprising a gas-tight housing and a mass of solid sorption agent contained therein, a heating means capable of heating the solid sorption agent, and a first heat-exchange means comprising a first pressure-resistant conduit;

a second heat-exchange means defining at least one of a thermally insulated evaporator and a condenser, said heat-exchange means comprising a second heat-exchange means having a second pressure-resistant conduit;

means for placing said first and second conduits in flow communication with one another;

separate in- and out-flow control devices operatively connected to said second conduit;

a mass of working medium of a substance capable of being in the liquid state; and connecting means defining pressure-resistant and poorly heat-conducting connections for conducting the working medium between said storage vessel and said second heat-exchange means.

This invention also relates to a sorption storage apparatus comprising at least three of the above-described storage apparatus coupled in a phase-shifted manner, thereby permitting a quasi-continuous mode of operation.

The apparatus of the invention can be used for heating or air-conditioning and in a particularly preferred embodiment it can be used as a vehicle heater or air-conditioner coupled to the fuel combustion gases of the vehicle's engine.

A more complete appreciation of the invention and many of the attendant advantages thereof will be readily perceived as the same becomes better understood by reference to the following detailed description when considered in connection with the accompanying drawings.

Figure 1:
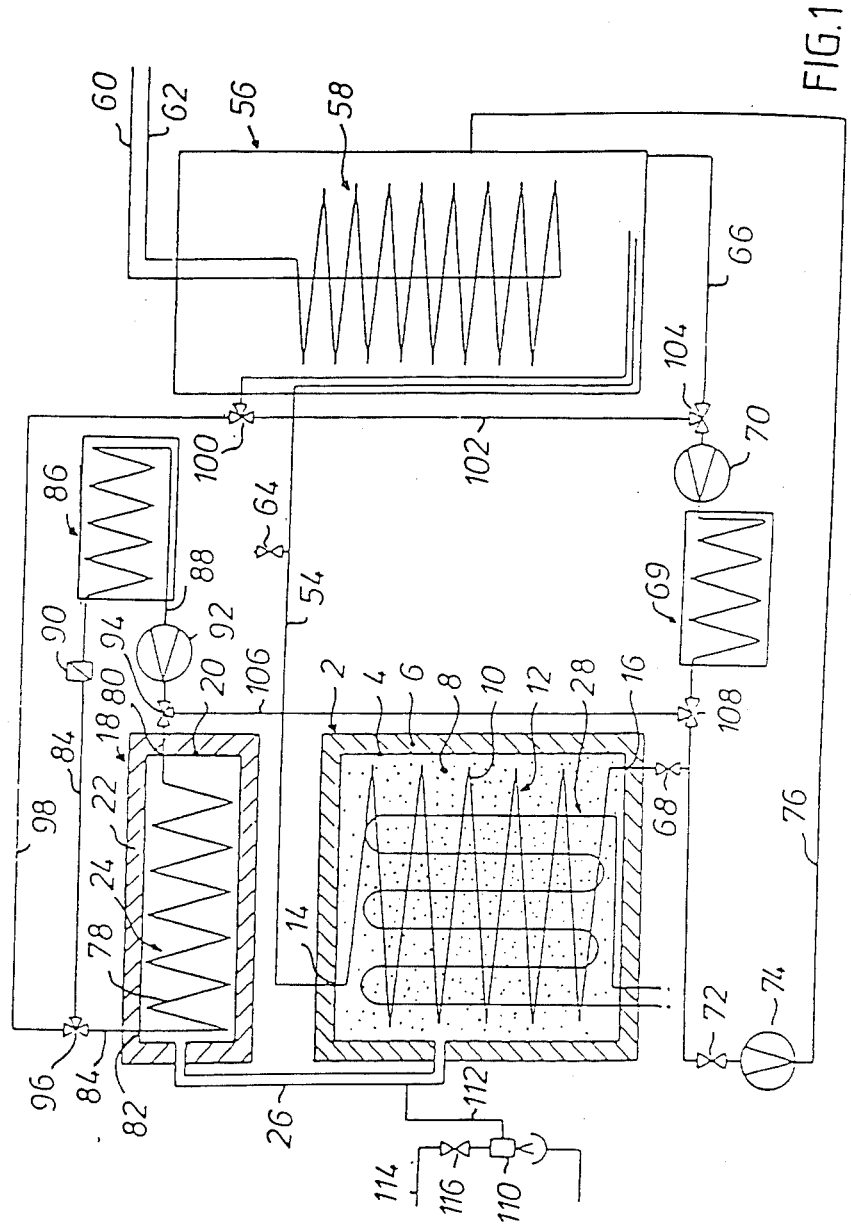
FIG. 1 is a schematic view of a first embodiment of the invention with a sorption storage apparatus having a solid-matter absorbent and an evaporator/condenser as a second heat-exchange means.

Other objects, advantages and features of the present invention will become apparent to those skilled in the art from the following discussion.

DESCRIPTION OF THE INVENTION

This invention provides an intermittently operating sorption apparatus for heat and cold storage having excellent efficiency. The present apparatus brought the unexpected surprising result that the above-discussed and abandoned prior art technology could be improved upon. The storage capability is attained herein by a consistent avoidance of heat outflow from the individual components, including the hydraulic communication system therebetween. Operational control of the intermittent operation is no longer performed by means of control devices (valve and/or pump devices) controlling the working medium or refrigerant in the primary system, but only by means of control devices for secondary heat-exchange fluids in the secondary system. Such control devices in the secondary system are economical and less susceptible to malfunctioning, if nothing else, simply because of their mode of operation, e.g., at atmospheric pressure.

Vacuum valves or recirculating devices for the working medium or refrigerant which are cost-intensive, susceptible to malfunctioning and usually a significant source of leakage can be dispensed with. Valve means which are commercially manufactured can be used for controlling the heat-exchange fluids. Finally, it is no longer necessary to surround the solid matter in the storage vessel with a pressure-resistant housing, because pressure-resistance is solely required inside the conduit system of the first heat-exchange means.

In the sorption storage apparatuses of the prior art, the heat-exchange of the storage vessel and the evaporator/condenser is effected by an external housing ribbing to an external gaseous medium. The embodiment wherein a pressure-resistant conduit system is contained in the storage vessel and in an evaporator/condenser or in separate evaporators and condensers makes it possible to use liquid heat-exchange media to supply heat and/or cold consumers or absorbers with high efficiency.

Within the scope of the invention, it is still more preferred to dispose the storage vessel in a first structural unit and have it connected to either an evaporator/condenser which is disposed in a second structural unit or separate evaporators and condensers which are disposed in a second and third separate structural units.

The combination evaporator/condenser has inherent thermodynamic efficiency disadvantages (losses) when compared with a separate evaporator and condenser system. If a combination evaporator/condenser is used, the efficiency loss can be between about 7% and 10% depending on how the process is performed. This loss is largely compensated for by the engineering advantages acquired with the substitution. The apparatus may be made compact, e.g., with the shortest possible external flow connections, in fact with merely a single connecting line. High efficiency is attained because the evaporator/condenser is completely thermally insulated from the environment. Moreover, the evaporator/condenser may even be provided with vacuum insulation and a (large) heat-resistant connecting line to the first structural unit. Furthermore, a minimal use of material for the second structural unit, which may be the only unit in addition to the first structural unit, results in a low consumptive thermal capacity.

If separate evaporators and condensers are used, the various structural units can be disposed with great flexibility and adapted for use with heat-exchange fluids.

However, a greater mass is involved where separate evaporators and condensers are used when compared to the use of a combined evaporator/condenser. This mass represents the thermal capacities. This system also requires more external flow connections which are also a sources of loss. Therefore, contrary to the general trend in systems with valve-controlled working media, in the context of the invention it is generally preferable to use combination evaporator/condensers.

The solid used in the context of the invention as the sorption agent is solely acted upon by the working medium or refrigerant. Thus, the outer covering of the solid is also required to be pressure-resistant. However, it is no longer necessary to provide a pressure-resistant storage vessel housing per se, because a majority of the supporting force countering the ambient atmospheric pressure can be exercised by the solid absorbent itself. In this system, the pressure drop occurs constantly from the outside to the inside. Thus, this kind of design permits the simple use of gas-tight housing walls containing the solid matter. In a limiting case these housing walls may even be foil-like thin.

The heating heat-exchange means of the invention may be embodied as in apparatuses described previously, e.g., as a gas heater (French Pat. No. 1,018,022), a steam heater (German Pat. No. 522,887), as a heater utilizing electric current (German Pat. No. 814,157) or in some other known manner.

According to a preferred embodiment, a heating fluid can be used which is carried by a pressure-resistant conduit system embedded in the solid. This heating heat-exchange means can be provided independently of the first heat-exchange means which eliminates heat from the solid absorbent.

It is also possible to couple the two heat-exchange means to a greater or lesser degree. A limiting case is that wherein both heat-exchange means are in fact provided together and are merely acted upon in opposite directions by separate heat-exchange fluids, or even perhaps by the same heat-exchange fluid at different temperatures. In this context, it is possible to keep the conduits separate while combining the ribbing into a unit.

It is suitable to use units of the type described by German Pat. No. 3,324,745 or its German Supplementary Patent No. 3,424,116 as functional units for the solid heat-exchange means. These units have their own pressure-resistant conduit systems, and optionally a strength suitable for receiving ambient atmospheric pressure.

A preferred embodiment is a modular design which can be adapted to specific performance requirements. It can be made from relatively small pre-fabricated modules that have been optimized in terms of both efficiency and performance. This applies not only to the novel design of the sorption storage apparatus according to the invention, but also to the control of its performance through selective switching. To connect a plurality of small sorption storage vessels in parallel is known per se from German patent disclosure document DE-OS No. 3,212,608 (see, in particular page 13, paragraph 3 of this reference).

A modular design is also attainable if all the modules are combined in a single first structural unit. Moreover, it is still possible to divide the first structural unit into subsidiary units.

Another application of a modular first structural unit is provided by making the inherently intermittent operation of the sorption storage apparatus according to the invention essentially quasi-continuous. This is attained by providing a phase-shifted sequence of at least two subsidiary sorption storage apparatuses in addition to the main apparatus according to the invention. A bidirectional operation with two subsidiary sorption storage apparatuses of the generic prior art type is already known per se from German Pat. No. 522,887.

Unexpectedly, it has been found that if the sorption storage apparatuses according to the invention use a gas heating device, they can even be embodied as air-conditioning systems for transportation vehicles. Previously, sorption storage apparatuses had been considered unsuitable as vehicle air-conditioners. However, the sorption storage apparatus of the invention can be provided precisely for use in a vehicle since it is lightweighted, lacks vacuum valves that tend to malfunction, is easily installable in a vehicle and has sufficiently high efficiency even when waste heat from the vehicle's exhaust gases is used. If the opportunity of dispensing with recirculating devices for the working medium is also taken into consideration, the result is a high operational reliability even under the conditions of vibration and jarring encountered in vehicle operation. A design can also be selected which has its own fuel combustion devices as is known in the art.

As indicated above, combined evaporator/condensers have somewhat limited efficiency. To maximize the use of their efficiency, separate conduit systems can be provided in the second heat-exchange device in the evaporator/condenser for the heat exchange fluid capable of eliminating heat and the heat-exchange fluid capable of supplying heat.

There are basically two alternative limiting cases for the embodiment of the respective external flow connection. In one limiting case, it is provided a short flow connection made from a material that is a poor thermal conductor. In another limiting case, it is provided a long flow connection made from a thin-walled metal material having low thermal conductivity. A preferred selection of materials for these two limiting cases is also provided.

As the heat-exchange fluid for eliminating heat from the solid absorbent it is also possible to use a fluid capable of undergoing a phase transition from liquid to gaseous phase during heat elimination. Accordingly, at the end of the cooling phase, the heat-exchange fluid is in liquid phase inside the first structural unit. If the solid absorbent is heated by a separate heat-exchange medium in the desorption phase, then it is preferable that the liquid heat-exchange fluid remaining in the first heat-exchange means do not be heated. That is, the fluid that has previously eliminated heat need not be reheated. To this end, an exhaust-pumping means is provided for withdrawing the liquid heat-exchange fluid remaining in the first heat-exchange means after heat elimination. This is accomplished prior to the beginning of the desorption phase. A secondary heat carrier loop lacking a pump system is known per se from German patent disclosure document DE-OS No. 3,212,608 (in particular, page 7, paragraph 2 of the document). The process of pumping the fluid is facilitated if a ventilation valve provided at the outlet of the first heat-exchange means.

Alternatively to the heat-eliminating heat-exchange fluid capable of the above-described phase transition, a heat-exchange fluid may also be provided which remains in liquid phase and thus fills the first heat-exchange means during the desorption phase as well. A similar provision is known per se from German patent disclosure document DE-OS No. 3,212,608, especially for filling a hot-water heater with water (see in particular, page 7, paragraph 2 of the reference). However, this concept can be generally applied, e.g., to a permanent filling with heat-carrier oil. Although this arrangement is less favorable in terms of efficiency, it still reduces the overall expenditure required, particularly in terms of pumping means, ventilation means and external switching valves.

The known generic sorption storage apparatuses are exclusively designed for refrigeration and the heat produced is given up to the external housing ribbing or to a cooling coil (German Pat. No. 522,887).

Instead, the sorption storage apparatus according to the invention is useful not only for refrigeration but also for generating heat. It is thus possible to use the apparatus according to the invention solely for generating heat. Possible heat consumers or absorbers for this embodiment are preferably a hot-water heater or a water boiler, e.g., tap-water boiler.

The conduit system of the heat-eliminating heat-exchange fluid of the first heat-exchange means is preferably in hydraulic communication with a supply vessel for the heat-exchange fluid in liquid state. If the heat-exchange fluid then undergoes a phase transition, the supply vessel can be used for intermediate storage of the heat-exchange fluid. This provides at the same time the opportunity of embodying the supply vessel as a heat consumer in the form of a tap-water boiler. Providing a tap-water boiler as a heat consumer or a hot-water heater is also generically known per se from German patent disclosure document DE-OS No. 3,212,608. This supply vessel may be used for receiving heat-exchange fluid that is being pumped out. In other cases, such as when a liquid heat-exchange fluid remains liquid throughout, the supply vessel may be embodied as a supply container. In all cases, the supply vessel may be embodied as a measuring vessel as well.

It is often desirable to lower the temperature of the solid absorbent to below the working temperature of the heat consumer, e.g., the tap-water storage vessel. As such, an opportunity is provided for limiting the heat absorption in the supply vessel. An opportunity is also provided for diverting the heat-eliminating heat-exchange fluid to a by-pass line during the then progressing absorption phase in the solid absorbent. In this fashion, heat continues to be given up to a different heat consumer. This different heat consumer may be a consumer of available heat or also of waste heat such as an air heater.

During operation of the apparatus, the composition of the working medium that is in the gaseous phase gradually worsens as a consequence of the admixture of additional components in gaseous or vapor form. This occurs by entry of components of ambient air or because of degassing events in the conduit systems. A gas pump device can be provided for regenerating the working medium which can be suitably placed into operation during service intervals. The simplest possible gas exhaust pump devices may be used herein. One such example is a water jet pump. This is particularly true if water is used as the working medium since the partial pressure is virtually due only to water vapor.

In terms of the conduit systems carrying the working medium, the structural units of the invention may also be designed for operation at high pressure. The operation at high pressure may occur regularly in one operating phase or may be performed specifically for servicing purposes by purposely heating at predetermined service intervals an evaporator/condenser or its two separate components (evaporator and condenser) to a temperature higher than the normal operating temperature. In this case, a gas valve device is provided as an overpressure safety means. In the latter instance where heating is performed specifically for servicing purposes, this device can also be used for eliminating contaminants.

The invention will now be described in detail in terms of several exemplary embodiments shown schematically in the drawings.

DESCRIPTION OF THE PREFERRED EMBODIMENTS

A sorption storage apparatus will now be described in terms of the functional association of its individual structural units and elements. Simultaneous three-dimensional arrangements are effected in order to attain a more compact association of the structural units in the closed loop of the working medium. These include a common fastening to a bottom plate in a supporting frame of a console or the like. This is done in a manner such that the sorption storage apparatus can be used as a separate appliance for any given cooling and/or heating need.

Absorbent solids known in the art can be used in all the embodiments. However, zeolite gel or silica gel are preferred. With both these solids, water or ammonia can be used as the preferred working medium. However, other working media can also be used.

The solid is contained in a first structural unit 2 which has a gas-tight housing 4 surrounded on the outside by a thermal insulator 6. Inside of the housing 4, a pressure-resistant conduit system 10 of a first heat-exchange means 12 is embedded in the solid 8 serving as the sorption agent. The conduit system 10 carries a heat-exchange fluid that eliminates heat from the solid 8. One end of the conduit system 10 is connected to the outlet 14 leading out of the first structural unit 2. The other end of the conduit system 10 is connected to the inlet 16 leading into the first structural unit 2.

In the embodiments of FIGS. 1-6, an evaporator/condenser is provided as a second structural unit 18 having a pressure-resistant housing 20 and an external thermal insulator 22.

The thermal insulators 6 and 22 comprise either a very good thermal-insulation material, such as a mineral-fiber mat, e.g., a glass-fiber mat, expanded plastic such as poly-urethane foam or even vacuum insulation.

A second heat-exchange means 24 is disposed inside the second structural unit 18, which carries a heat-exchange fluid capable of eliminating heat in a condensation phase or to supply heat in an evaporation phase.

The interior of the pressure-resistant housing 20 of the second structural unit 18 communicates with the interior of the gas-tight housing 4 of the first structural unit by a constant external pressure-resistant flow connection 26, whereby a working medium is carried between the interior of the two housings 4 and 20 by an external flow connection 26 in a closed system. The external flow connection 26 is preferably a poor heat conductor.

Inside the housing 4 of the first structural unit 2, there can be at least one compact functional unit 130 of the solid heat-exchange means which supports the housing 4 against ambient atmospheric pressure. In a limiting case, the housing 4 can be foil thin. In other cases, the housing 4 can itself be pressure-resistant. This is particularly so if the working medium is to be used at a pressure greater than atmospheric pressure.

Figure 6:
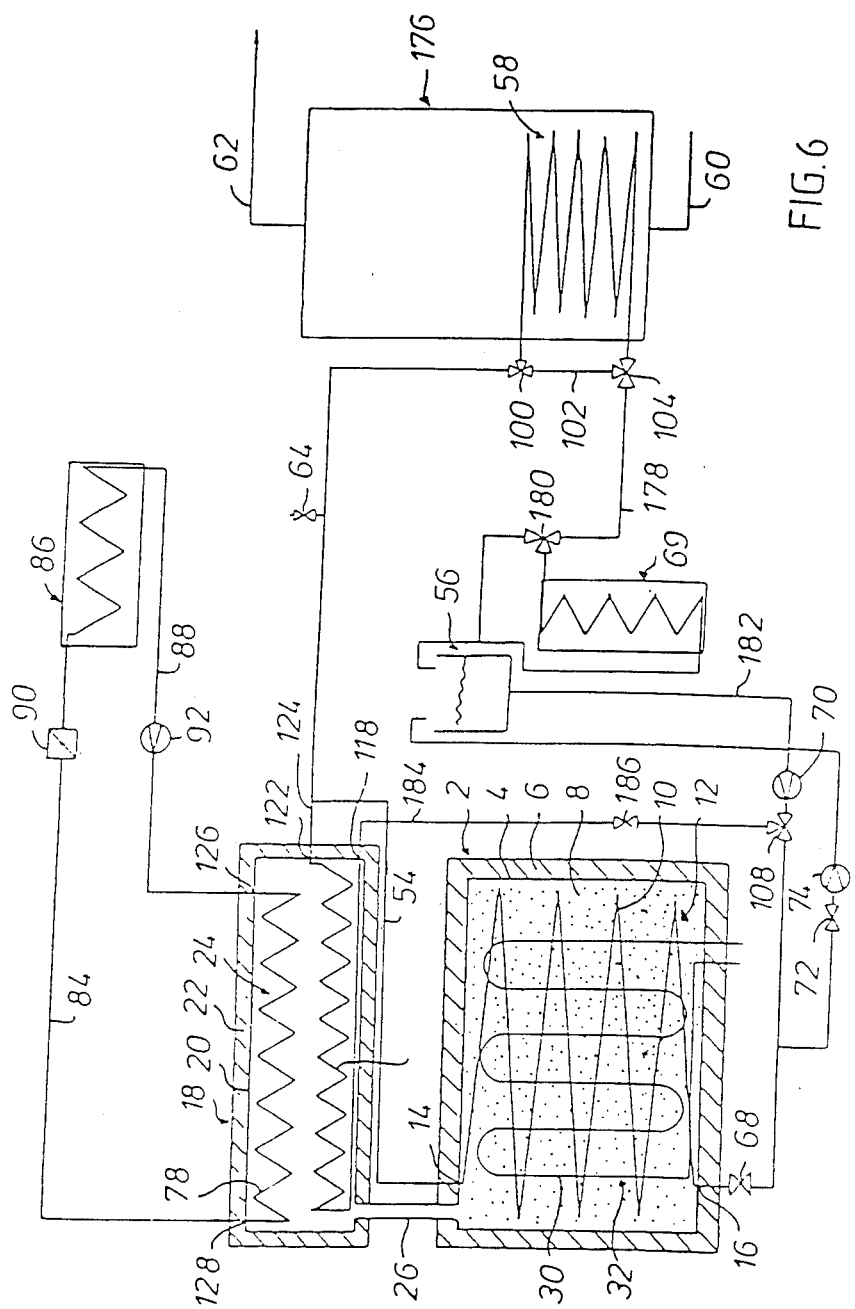
FIG. 6 is a schematic view of a sixth exemplary embodiment which is a variant of the second embodiment having additional structural elements in the loop of the heat-exchange fluids.

The solid 8 of the first structural unit is heatable by means of a heating medium. Without limiting the scope of the invention, an electric heating device 28 is provided in the exemplary embodiments of FIGS. 1 and 3 whereby the two poles of a heating direct current extend out of the first structural unit 2 and a hot wire passes through the solid 8. Any other embodiment may also be used instead of hot wire, e.g., immersion heaters. In the embodiment of FIGS. 2 and 6, a pressure-resistant conduit system 30 embedded in the solid and belonging to a heating heat-exchange means 32 acted upon by a heating fluid is provided instead. In the embodiment of FIGS. 2 and 6, a heating heat-exchange means 32 is shown which is separate from the first heat-exchange means 12. A variant is also shown in broken lines, in which the two heat-exchange means 12 and 32 share a common ribbing 34 (FIG. 2).

Figure 4:
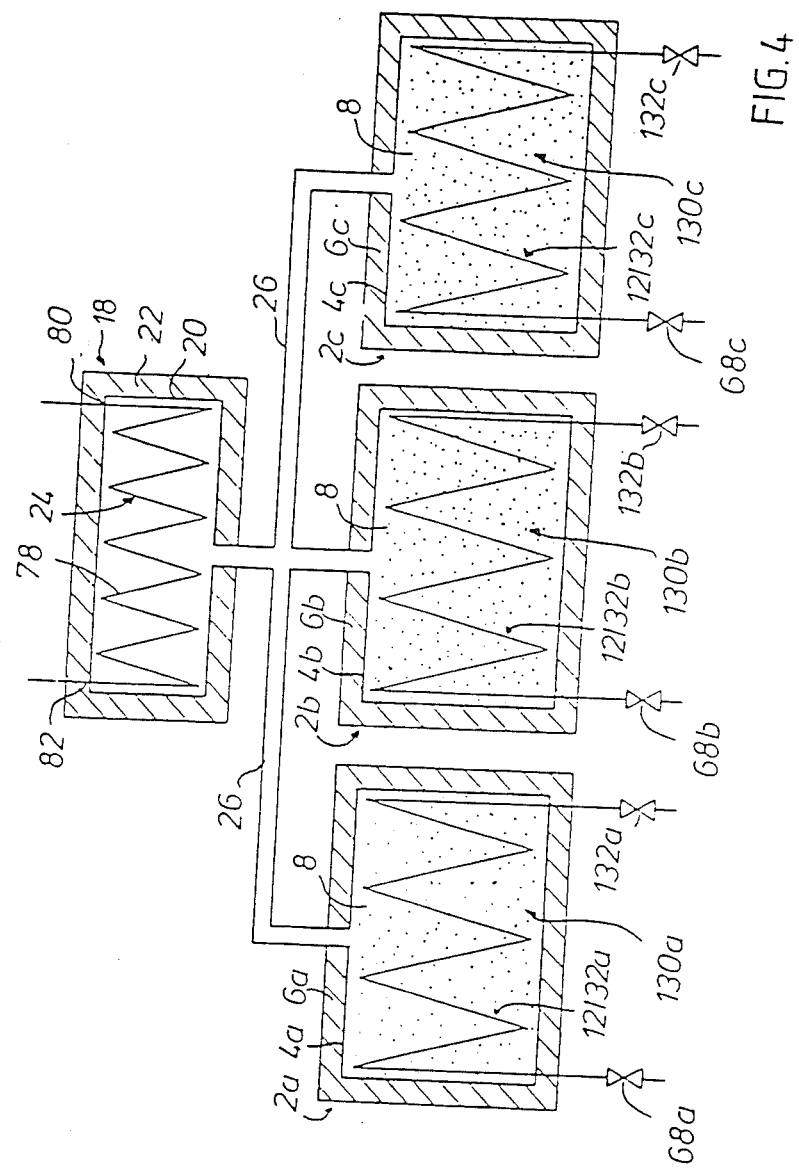
FIG. 4 is a schematic view of a fourth embodiment which is a variant embodiment of the first structural unit in combination with an evaporator/condenser according to the first embodiment.
Figure 5:
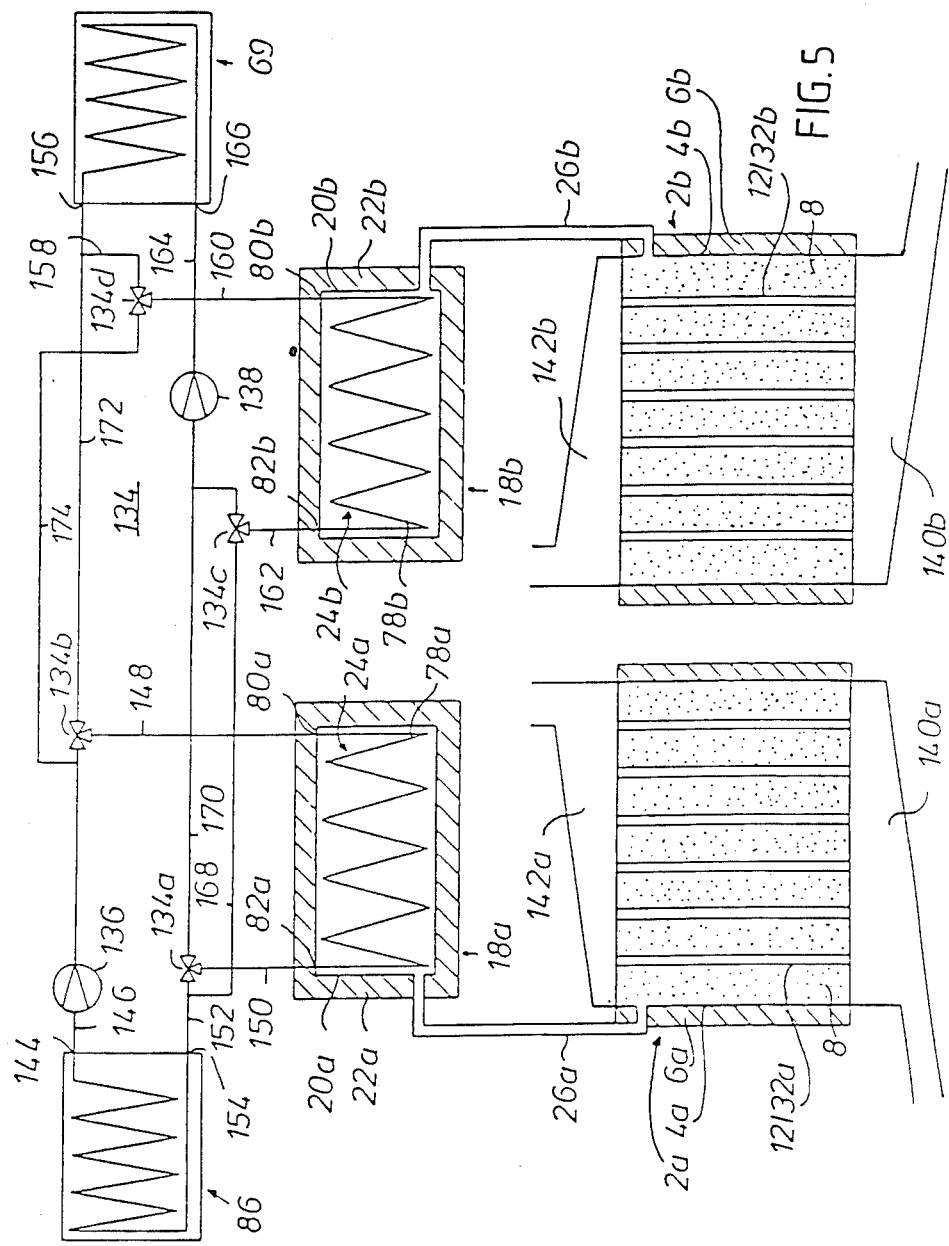
FIG. 5 is a schematic view of a fifth embodiment offering a possibility for associating first structural units with second structural units embodied according to the first exemplary embodiment for a phase-shifted quasi-continuous operation of the sorption storage apparatus.
Figure 7:
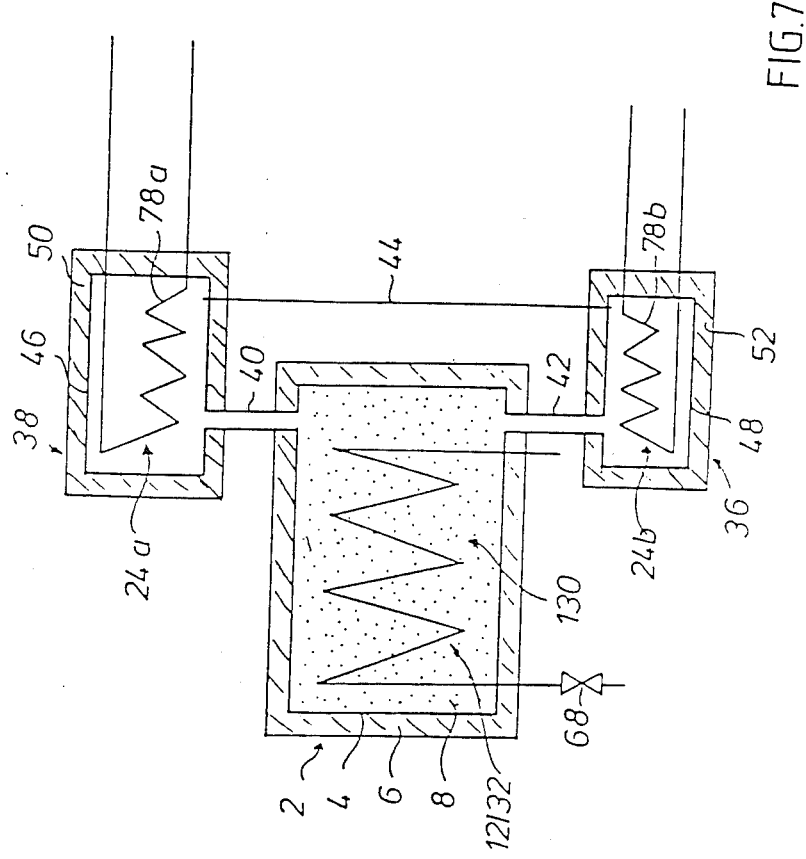
FIG. 7 is a schematic view of an alternative seventh embodiment in which an evaporator/condenser is replaced by a single evaporator and/or a single condenser.

FIGS. 4, 5 and 7 illustrate another limiting case in which both the first heat-exchange means 12 and the heating heat-exchange means 32 are identical and carry, although for different purposes, the same heat-exchange fluid in different heating states.

It will be understood that these variants, as well as those described below in the various exemplary embodiments, can arbitrarily be exchanged for one another as desired.

In the embodiments of FIGS. 4 and 7, the heating fluid is strictly liquid whereas in the embodiment of FIG. 5 the heating fluid is gaseous. Once again the first heat-exchange means 12 and the heating heat-exchange means 32 are the same.

In the embodiment of FIG. 7, the second structural unit 18 forming an evaporator/condenser unit is replaced by a structural unit 36 forming an evaporator and another structural unit 38 forming a condenser. Similarly, the single flow connection 26 is divided into line segments 40 and 42 respectively that carry the working medium vapor and a segment 44 that carries the working medium condensate, respectively. Segment 40 connects the first structural unit 2 with the structural unit 38. Segment 42 connects the first structural unit with the structural unit 36 and segment 44 connects the structural units 36 and 38 with one another. The result is a closed loop of working medium between the pressure-resistant housings 46 and 48 of the structural units 36 and 38 as well as the housing 4 of the first structural unit 4. The structural units 36 and 38 also have external thermal insulators 50 and 52 respectively which are similar to the thermal insulator 22 of the second structural unit 18 of the embodiments of FIGS. 1-6. All the segments 40, 42 and 44 as well as the flow connection 26 of FIGS. 1-6 are heat-resistant.

FIG. 6 illustrates an arrangement that can be applied to the other embodiments as well. In FIG. 6, the flow connection 26 is particularly short. In limiting case, the thermal insulators 22 and 6 can be immediately adjacent to one another (not shown).

The various embodiments also have the following special features.

Figure 2:
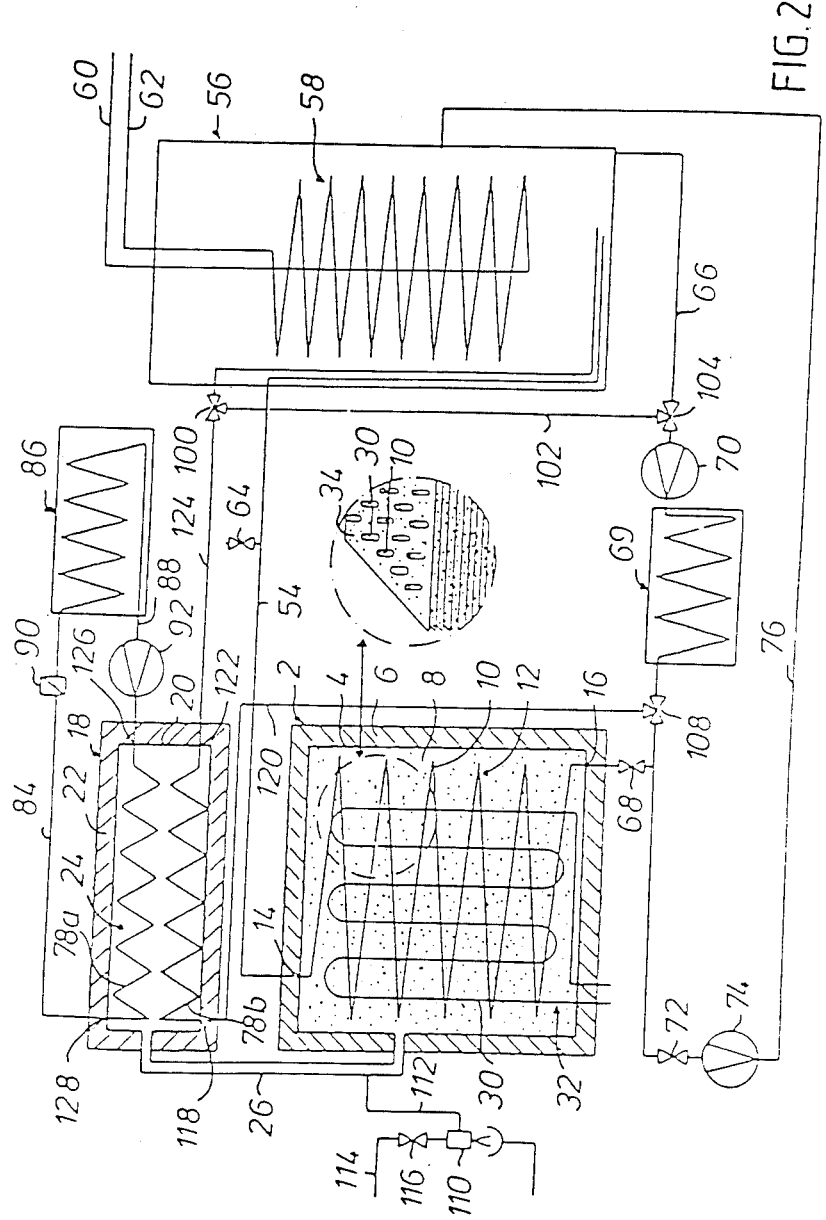
FIG. 2 is a schematic view of a second embodiment of the invention in which the first embodiment is modified by embodying the second heat-exchange means differently.

In the embodiment of FIG. 1, the outlet 14 of the first structural unit 2 communicates via a fluid line 54 with the interior of a supply container 56. The supply container 56 can be provided as a water boiler, e.g., tap-water boiler, which has a heat-exchange means 58 supplying and carrying away tap-water through connections 60 and 62. A ventilation valve 64 is connected to the fluid line 54. Following the supply container 56, the fluid line 54 is continued as fluid line 66. Fluid line 66 communicates with the inlet 16 by means of a valve 68 for controlling the heat-exchange fluid. A heat consumer or absorber 69 is incorporated into fluid line 66 and is preceded by a circulating pump 70 for the heat-exchange fluid that eliminates heat produced by the first structural unit 2.

Ahead of the inlet of the valve 68, the fluid line 66 is also in flow communication with the supply chamber of the supply container 56 by means of a shut-off valve 72 and a suction pump 74 and a continuing fluid line 76. A heat-exchange fluid is used of the type that undergoes a phase transition. This fluid which eliminates heat from the first structural unit 2 can be pumped out of the conduit system 10 in liquid phase by means of the suction pump 74 and into the supply container 56 prior to the beginning of the desorption phase.

The second heat-exchange means 24 of the second structural unit 18 has a single pressure-resistant conduit system 78 which extends throughout the space surrounded by the housing 20 and has both an inlet 80 and an outlet 82 of the second structural unit 18.

The outlet 82 leads by means of a fluid line 84 to the inlet of a cold consumer 86, the outlet of which communicates hydraulically via a fluid line 88 with the inlet 80 of the second structural unit 18. A throttle 90 is incorporated into the fluid line 84. A circulating pump 92 is incorporated into the fluid line 88. This pump is in communication with the inlet 80 by a three-way cock 94. Similarly, a further three-way cock 96 is incorporated into the fluid line 84 following the outlet 82.

The free connection of the three-way cock 96 leads by a fluid line 98 to a three-way cock 100 and through it into the supply container 56. The free connection of the three-way cock 100 leads by a continuing fluid line 102 to still another three-way cock 104 which is incorporated into the fluid line 66 between the circulating pump 70 and the supply container 56.

The free connection of the three-way cock 94 further communicates by a fluid line 106 with yet another three-way cock 108. The two other connections of the cock 108 are incorporated into the fluid line 66 between the inlet of the valve 68 and the outlet of the heat consumer 69.

Finally, the flow connection 26 communicates with a water jet pump 110 by a branch line 112 and the water line 114 thereof is controlled by a shut-off valve 116.

The intermittent operating phases of the sorption storage apparatus described are as follows.

In the desorption phase, the solid 8 is heated with the heating medium, e.g., the electric heating device 28. In this process, the working medium absorbed or adsorbed in the solid 8 is expelled and transferred by the flow connection 26 to the second structural unit 18 where it is condensed. The outlet 82 is hydraulically connected to the supply container 56 by means of the fluid line 98 during this process. From the supply container 56, the same heat-exchange fluid is carried on by the fluid line 66 through the circulating pump 70 to the heat consumer 69 and from there is returned via the line 106 and the three-way cock 94 to the second heat-exchange means 24 of the second structural unit 18.

Once the supply container 56 has attained the desired operating temperature, the three-way cocks 100 and 104 are repositioned and circulation then takes place by means of the fluid line 102, now acting as a bypass line, bypassing the supply container 56 and leading directly between the fluid line 98 and the fluid line 66.

In the absorption phase, the heating medium for the solid is shut off. Then, with an appropriate repositioning of the valve 68 and of the three-way cocks 104 and 108, circulation of the heat-eliminating heat-exchange fluid is effected out of the pressure-resistant conduit system 10 of the first heat-exchange means 12, through the outlet 14 and the line 54, into the supply container 56 and from there by way of the line 66 and the valve 68 back to the inlet 16 of the first structural unit 2.

When the solid 8 cools down, the absorption begins of the working medium which had condensed in the evaporator/condenser of the second structural unit 18. When the evaporation temperature determined by the cold consumer is attained in the second structural unit 18, the three-way cocks 94 and 96 are repositioned and the adjustable throttle 90 is opened. The heat-exchange fluid which is now supplying heat to the second structural unit 18 is pumped by circulating pump 92 through the conduit system 78 of the second structural unit 18 and flows by way of the line 84 to the cold consumer or absorber 86 and from it back to the circulating pump 92 by the line 88. In this process, the heat-exchange fluid cools down between the inlet 80 and outlet 82 of the second structural unit 18.

Figure 3:
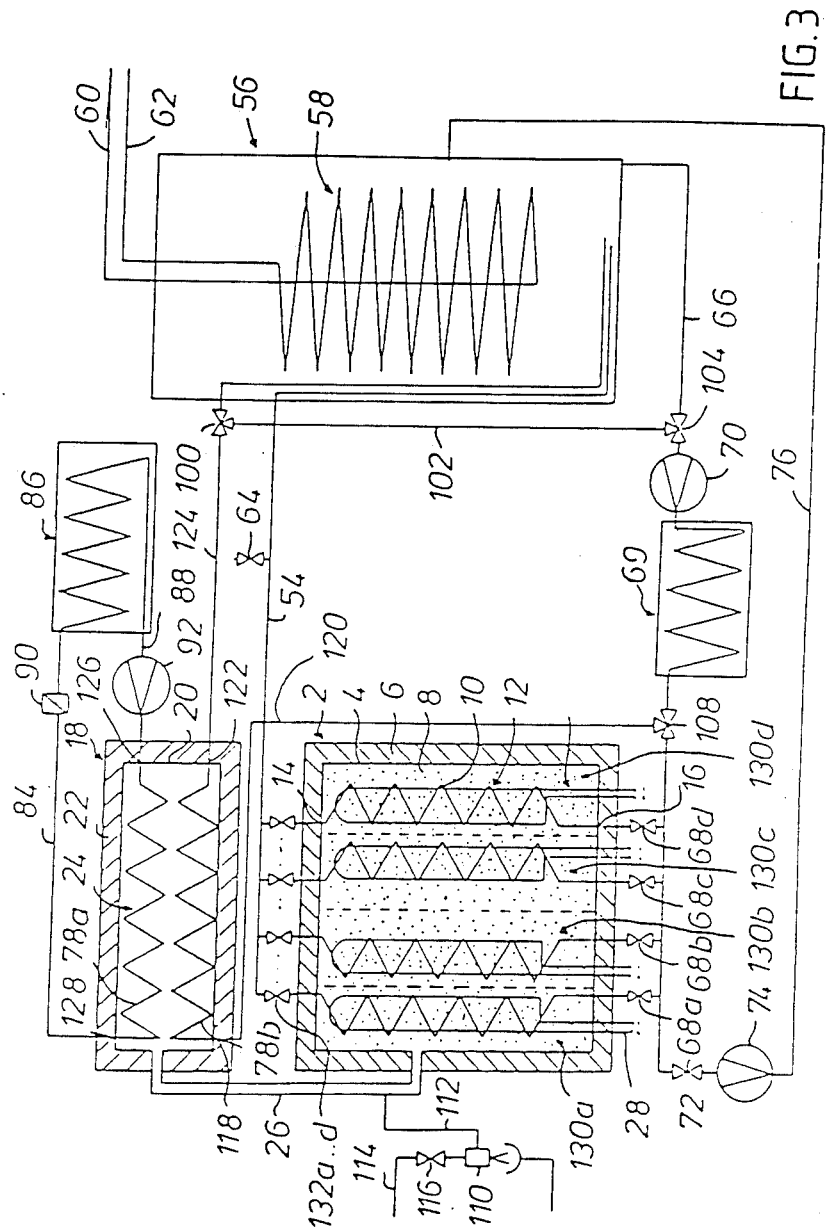
FIG. 3 is a schematic view of a third embodiment in which the second embodiment in the first structural unit is modified.

In the embodiments according to FIGS. 2, 3 and 6, a second heat-exchange means 24 of the second structural unit 18 has separate pressure-resistant conduit systems 78a and 78b to carry the heat-exchange fluid supplying heat to the second structural unit and the heat-exchange fluid eliminating heat from the second structural unit in separate loops. As a result, the fluid line 98 and the two three-way cocks 94 and 98 of the embodiment of FIG. 1 are dispensed with. Instead, the three-way cock 108 communicates with the inlet 118 of the conduit system 78b via the fluid line 120, and the outlet 122 of the conduit system 78b communicates with the three-way cock 100 by means of the fluid line 124. The fluid line 120 thus replaces the fluid line 106 of the embodiment of FIG. 1.

The outlet of the circulating pump 92 now communicates with the inlet 126 and the fluid line 84 communicates with the outlet 128 of the conduit system 78a.

The mode of operation is largely analogous to that of the embodiment of FIG. 1. This is particularly true for the actuation of the valves and three-way cocks in the desorption phase to the extent that they are still present.

In the absorption phase, the cooling loop is controlled solely by actuating the pump 92 and the adjustable throttle 90.

The embodiment according to FIG. 3 is patterned after that of FIG. 2 with the following difference.

In the first structural unit, the functional units 130a, 130b, . . . of the heat-exchange means are disposed together inside the housing 4 and are incorporated by selectively incorporatable inlet valves 68a, 68b, . . . and outlet valves 132a, 132b, . . . associated with them into the circulation, effected by the lines 66 and 54, of the heat-exchange fluid eliminating heat from the first structural unit. Each solid heat-exchanger functional unit 130a, 130b, . . . includes its own heating heat-exchange means which is shown as an electric heating device 28 as in FIG. 1 in a modification of FIG. 2.

FIG. 4 shows that instead of an arrangement of various solid heat-exchange functional units 130a, 130b, . . . in a common housing 4 as in FIG. 3, it is also possible to provide the individual solid heat-exchange means as functional units 130a, 130b, . . . with their own housings 4a, 4b, . . . and their own thermal insulators 6a, 6b, . . . , so that each solid heat-exchange means functional unit 130a, 130b, . . . together with associated housing and it associated thermal insulator forms separate structural units 2a, 2b, . . .

Associated with the various structural units 2a, 2b, . . . is a single second structural unit 18 of the type shown in FIG. 1. However, the type shown in FIG. 2 may also be provided.

The housings 4a, 4b, . . . of the various structural units 2a, 2b, . . . communicate from their interiors with the interior of the second structural unit 18 by means of permanent external lines 26.

The valves 68a, 68b, . . . as well as the outlet valves 132a, 132b, 132c and the remaining course of the loop as well as its control correspond to the provisions of FIG. 3.

Without limiting the scope of the invention, in the embodiment of FIG. 5, the second structural units 18 are doubled and provided as structural units 18a and 18b. These are continuously in flow communication, by flow connections 26a or 26b, respectively, of the type shown in FIG. 1, with a first structural unit 2a or 2b individually associated with each second structural unit conducting the working medium.

The operational link-up may correspond to that of FIG. 1, but doubled. In this case, a bi-directional mode of operation, i.e., a phase-shifted operation, takes place.

In the case of FIG. 5, a structure and operational link-up suitable for vehicle air-conditioners is shown as a further possibility for providing the first structural unit 2.

In terms of the link-up, a heat consumer 69 and a cold consumer 86 are placed in communication with the two second structural units 18a and 18b, or with their second heat-exchange means by means of a control valve device 134 which can be operated bi-directionally. Each of circulating pumps 136 and 138, respectively, serve to operate the refrigeration and heating loops, respectively, of the corresponding consumer.

The combined heat-exchange means for the heat-exchange fluid eliminating heat from the first structural unit and for the heating medium (reference numeral 12/32) is connected here by means of inlet pipes 140 and outlet pipes 142. This is done by connecting them either to the exhaust gas of an internal combustion engine of a motor vehicle or alternatively to an independent fuel-burning device of the vehicle. This kind of operation alternative where cooling air is carried by reversing valves is not shown.

The valve control device 134 embodies the following functional link-up.

The outlet 144 of the cold consumer 86 leads by way of a fluid line 146 to the three-way cock 134b. The circulating pump 136 is incorporated into the fluid line 146. From the three-way cock 134b, a fluid line 148 leads to the inlet 80a of the second structural unit 18a. Its outlet 82a leads by way of a fluid line 150 to the three-way cock 134a which in turn communicates hydraulically by way of a fluid line 152 with the inlet 154 of the cold consumer 86.

Correspondingly, the outlet 156 of the heat consumer 69 communicates by means of a fluid line 158 with the three-way cock 134d. This, in turn, communicates hydraulically by way of a fluid line 160 with the inlet 80b of the second structural unit 18b. Its outlet 82b leads by way of a fluid line 162 to the three-way cock 134c which, by a further fluid line 164 into which the circulating pump 138 is incorporated, leads to the inlet 166 of the heat consumer 69.

The following linkups ar provided between the above-described two loops for the phase transition.

The free connection of the three-way cock 134c leads by way of a fluid line 168 to a branch of the fluid line 152. The free connection of the three-way cock 134a leads by means of a further fluid line 170 to a branch of the fluid line 164. The free connection of the three-way cock 134b leads by still another fluid line 172 to a branch of the fluid line 158. Finally, the three connection of the three-way cock 134d leads by a fluid line 174 to a branch of the fluid line 146.

A quasi-continuous operation becomes possible because the three-way cocks 134a and 134b, and 134c and 134d are reversed in opposite directions.

FIG. 6 shows a variant of FIG. 2 having the following special feature.

In the embodiment of FIG. 2 the supply vessel 56 serves a dual function as storage means for the heat-exchange fluid and a hot-water boiler. These two functions are assigned to two separate components in the embodiment of FIG. 6, i.e., the supply vessel 56 serving here as a pressure-equalization vessel and an independent commercially available hot-water boiler 176 which in this case is a standard heat consumer.

As is usual with commercially available hot-water heaters, the interior of the boiler is included in the tap-water loop by the inlet 60 and the outlet 62.

The heat-exchange means 58 disposed inside the boiler does not communicate with the inlet 60 and outlet 62 as in FIG. 2, but rather with the three-way cocks 100 and 104.

The free end of the three-way cock 104 communicates with the supply vessel 56 by a fluid line 178. A three-way cock 180 is incorporated into the fluid line 178 and its free connection leads to the inlet of the heat consumer 69, the outlet of which leads back into the line 178. Depending on how the three-way cock 180 is switched, the three-way cock 104 communicates hydraulically with the supply vessel 56 either directly or by way of the heat consumer 69.

The outlet of the supply vessel 56 leads by a fluid line 182, in which the circulating pump 70 is incorporated, to the three-way cock 108.

While the permanent connection of the three-way cock 108 leads to the valve 68 as in FIG. 2, its free connection is connected to a further fluid line 184 which leads as far as the inlet 118 of the pressure-resistant conduit system 78b. A shut-off valve 186 is incorporated into the fluid line 184.

It will be understood that the above description of the present invention is susceptible to various modifications, changes and adaptations, and the same are intended to be comprehended within the meaning and range of equivalents of the appended claims.

The present disclosure relates to the subject matter disclosed in German patent application, No. P 35 32 093.1 filed on Sept. 9th, 1985, the entire specification of which is incorporated herein by reference.

What is claimed is:

1. An intermittently operating sorption apparatus for heat and cold storage comprising
    a thermally insulated storage vessel comprising
        a gas-tight housing and a mass of solid sorption agent contained therein,
        a heating means capable of heating the solid sorption agent, and
        a first heat-exchange means comprising a first pressure-resistant conduit;
    a second heat-exchange means defining at least one of a thermally insulated evaporator and a condenser, said heat-exchange means comprising a second pressure-resistant conduit;
    means for placing said first and second conduits in flow communication with one another;
    separate in- and out-flow control devices operatively connected to said second conduit;
    a mass of working medium of a substance capable of being in the liquid state; and
    connecting means defining pressure-resistant and poorly heat-conducting connections for conducting the working medium between said storage vessel and said second heat-exchange means.

2. The sorption storage apparatus of claim 1, wherein the storage vessel is provided as a first structural unit; and
    the evaporator and the condenser are provided as a combined evaporator/condenser as a second structural unit.

3. The sorption storage apparatus of claim 1, wherein the storage vessel is provided as a first structural unit;
    the evaporator is provided as a second structural unit comprising the second heat-exchange means; and
    the condenser is provided as a third structural unit comprising a third heat-exchange means having a third pressure-resistant conduit; wherein separate in- and out-flow devices are operatively connected to each of said second and third conduits.

4. The sorption storage apparatus of claim 1, wherein the housing of the storage vessel is structurally supported by the mass of solid-sorption agent contained therein.

5. The sorption storage apparatus of claim 1, wherein the first pressure-resistant conduit is embedded in the solid sorption agent; and
    the heating means includes means for carrying a heating fluid.

6. The sorption storage apparatus of claim 5, wherein the first heat-exchange means of the storage vessel and the heating means are provided separately.

7. The sorption storage apparatus of claim 5, wherein the first heat-exchange means and the heating means of the storage vessel are provided as one unit.

8. The sorption storage apparatus of claim 7, wherein the first heat-exchange means and the heating means of the storage vessel have separate conduits and have a common ribbing.

9. The sorption storage apparatus of claim 1, wherein the storage vessel comprises a plurality of first heat-exchange means, said first heat-exchange means being connected in parallel to each other; and
    each first heat-exchange means is in flow communication with the second heat-exchange means.

10. The sorption storage apparatus of claim 9, further comprising
    means for independently actuating each of the plurality of first heat-exchange means.

11. The sorption storage apparatus of claim 9, wherein
    the plurality of first heat-exchange means are contained in a common thermally insulated storage vessel housing.

12. The sorption storage apparatus of claim 9, wherein
each first heat-exchange means has a separate thermally insulated housing.

13. An intermittently operating sorption storage apparatus, comprising
at least three sorption storage apparatuses of claim 1 coupled to one another in a phase-shifted manner, thereby permitting a quasi-continuous mode of operation.

14. A vehicle air conditioning apparatus, comprising the sorption storage apparatus of claim 13, wherein
the heating means is a device heated by fuel combustion gases of the vehicle engine.

15. The sorption storage apparatus of claim 1, wherein
the second heat-exchange means has separate conduits for a first heat-exchange means fluid capable of withdrawing heat and a second heat-exchange means fluid capable of supplying heat.

16. The sorption storage apparatus of claim 1, wherein
the connecting means between said storage vessel and said second heat-exchange means is short and made from a material having low thermal conductivity.

17. The sorption storage apparatus of claim 16, wherein
the material of the connecting means comprises a glass or ceramic material.

18. The sorption storage apparatus of claim 1, wherein
the connecting means between said storage vessel and said second heat-exchange means is made from a thinwalled metal material having low thermal conductivity.

19. The sorption storage apparatus of claim 18, wherein
the material of the connecting means is a nickel-chromium steel.

20. The sorption storage apparatus of claim 1, further comprising
pumping means provided for pumping liquid heat-exchange means fluid out of the first conduit of the storage vessel prior to the beginning of a desorption phase, and wherein
the second conduit conducts a heat-withdrawing heat-exchange fluid, said fluid being capable of undergoing a phase transition from the liquid to the gaseous phase throughout the operation of the apparatus.

21. The sorption storage apparatus of claim 20, wherein
the heat-withdrawing heat-exchange means fluid is water.

22. The sorption storage apparatus of claim 20, wherein
a valve means is provided at the outlet of the first heat-exchange means of the storage vessel.

23. The sorption storage apparatus of claim 1, wherein
the second conduit is arranged to conduct a heat-withdrawing heat-exchange fluid, said fluid continuously filling the first heat-exchange means and being capable of remaining in liquid phase throughout the operation of the apparatus.

24. The sorption storage apparatus of claim 1, further comprising
a cold-consumer or absorber; and
a heat-consumer or absorber; and wherein
the second heat-exchange means is an evaporator,
the second conduit and the cold-consumer are in flow communication, and
the first conduit of the first heat-exchange means and the heat-consumer or absorber are in flow communication.

25. The sorption storage apparatus of claim 24, wherein
the second conduit of the second heat-exchange means is arranged to conduct a heat-eliminating fluid and is in flow communication with the heat consumer or absorber.

26. The sorption storage apparatus of claim 24, wherein the heat-consumer or absorber is a hot-water heater.

27. The sorption storage apparatus of claim 1, further comprising
a supply vessel for a liquid heat-exchange fluid, wherein the first conduit of the first heat-exchange means of the storage vessel is in flow communication with the supply vessel.

28. The sorption storage apparatus of claim 27, wherein
the supply vessel is a water boiler.

29. The sorption storage apparatus of claim 27, further comprising
a by-pass conduit capable of by-passing the supply vessel and connecting the inlet of the first conduit of the first heat-exchange means with the outlet of the second conduit of the second heat-exchange means, said by-pass conduit capable of withdrawing the heat-eliminating fluid from the first heat-exchange means.

30. The sorption storage apparatus of claim 1, further comprising
a gas exhaust pump means connected to the connecting means conducting the working medium.

31. The sorption storage apparatus of claim 1, further comprising
a gas overpressure valve means connected to the connecting means conducting the working medium.

32. The sorption storage apparatus of claim 30, wherein
said pump means is a water jet pump.

* * * * *